(12) United States Patent
Lau

(10) Patent No.: US 7,189,004 B2
(45) Date of Patent: Mar. 13, 2007

(54) THRUST CAP

(75) Inventor: James Ching Sik Lau, Hong Kong (HK)

(73) Assignee: Johnson Electric S.A., La Chaux-de-Fonds (CH)

( * ) Notice: Subject to any disclaimer, the term of this patent is extended or adjusted under 35 U.S.C. 154(b) by 470 days.

(21) Appl. No.: 10/757,520

(22) Filed: Jan. 15, 2004

(65) Prior Publication Data

US 2004/0146230 A1 Jul. 29, 2004

Related U.S. Application Data

(60) Continuation-in-part of application No. 10/154,953, filed on May 28, 2002, now Pat. No. 6,698,933, which is a division of application No. 09/679,548, filed on Oct. 6, 2000, now abandoned.

(30) Foreign Application Priority Data

Oct. 9, 1999 (GB) .................. 9923857.8

(51) Int. Cl.
*H02K 5/16* (2006.01)

(52) U.S. Cl. .................. 384/228; 384/420; 384/425; 310/90

(58) Field of Classification Search ........... 384/228, 384/420, 425; 310/67 R, 42, 89, 90
See application file for complete search history.

(56) References Cited

U.S. PATENT DOCUMENTS 2,701,845 A 2/1955 Gallagher et al.
3,604,962 A 9/1971 Larson et al.
3,720,852 A 3/1973 Vieweg
4,612,468 A 9/1986 Sturm et al.
5,811,903 A 9/1998 Ueno et al.
5,886,438 A 3/1999 Kawanishi

FOREIGN PATENT DOCUMENTS

| DE | 38 09 277 | 9/1998 |
| FR | 2 765 741 | 1/1999 |
| GB | 1 104 603 | 2/1968 |
| GB | 1 128 319 | 9/1968 |
| GB | 2 217 784 | 1/1989 |
| GB | 250 062 A2 | 5/1992 |
| GB | 265 688 A2 | 10/1993 |
| GB | 347 504 A2 | 3/1998 |
| GB | 2 332 989 | 7/1999 |
| GB | 2 354 558 | 3/2001 |
| JP | 2-146942 | 6/1990 |
| JP | 6-284637 | 10/1994 |
| JP | 7-15905 | 1/1995 |
| JP | 07-39102 | 2/1995 |
| JP | 10-66301 | 3/1998 |
| JP | 10-174354 | 6/1998 |

OTHER PUBLICATIONS

Patent Abstract of Japan, 09135562, May 20, 1997.
Patent Abstract of Japan, 63018949, Jan. 26, 1988.

*Primary Examiner*—William C. Joyce
(74) *Attorney, Agent, or Firm*—Birch, Stewart, Kolasch and Birch, LLP

(57) ABSTRACT

The motor has a thrust cap fitted to its end cap by snap fit fingers. The thrust cap closes a hole in the bearing retainer of the end cap and provides a thrust bearing surface against which the end of the shaft contacts to limit axial movement or end play of the shaft. The thrust bearing surface is part of a metallic spring fixed to a body of the thrust cap.

8 Claims, 2 Drawing Sheets

THRUST CAP

RELATED APPLICATIONS

This application is a continuation-in-part of U.S. patent application Ser. No. 10/154,953 filed May 28, 2002, now U.S. Pat. No. 6,698,933 which was a divisional application of U.S. patent application Ser. No. 09/679,548 filed Oct. 6, 2000 (now abandoned) which claimed convention priority under the Paris Convention from British patent application No. GB 9923857.8 filed Oct. 9, 1999, which are incorporated by reference.

FIELD AND BACKGROUND OF THE INVENTION

This invention relates to an electric motor and in particular, to a miniature electric motor with a combined bearing cover/thrust plate.

Small electric motors are very common and are often used with pinions fitted to the output shaft. Usually, such motors will have a thrust bearing of some form to limit the axial movement of the shaft. However, often the pinion is fitted to the output shaft after the motor has been fully assembled by the purchaser of the motor. As a result, the thrust bearing is damaged when the pinion is fitted due to the relatively large force required to press the pinion on to the shaft which is bearing directly onto the thrust bearing.

One solution to this problem is to use stronger thrust plates but while this reduces the damage to the thrust plate, it does not eliminate the damage and it does add significantly to the cost of the motor. Alternatively, the force required to fit the pinion can be reduced but this can lead to other problems such as loose pinions.

Hence, there is a need for a thrust plate which can avoid being damaged during fitting of a pinion to the output shaft of a miniature electric motor.

SUMMARY OF THE INVENTION

Accordingly, the present invention provides a thrust cap for an electric motor comprising: a thrust cap body; a thrust bearing surface supported by the body; and securing means for securing the thrust cap body to the electric motor, said securing means including a plurality of snap fit fingers having tapered heads with shoulders for engaging an inner surface of a housing part of said motor; wherein the thrust bearing surface is sprung and arranged to be in continuous contact with a rounded end of a shaft of the motor spaced from the axial center so as to provide radial and axial force components and to urge the shaft axially away from the thrust bearing cap.

The present invention also provides an electric motor incorporating such a thrust cap.

Preferred embodiments of the invention will now be described, by way of example only, with reference to the accompanying drawings.

DETAILED DESCRIPTION OF THE PREFERRED EMBODIMENTS

Figure 1:
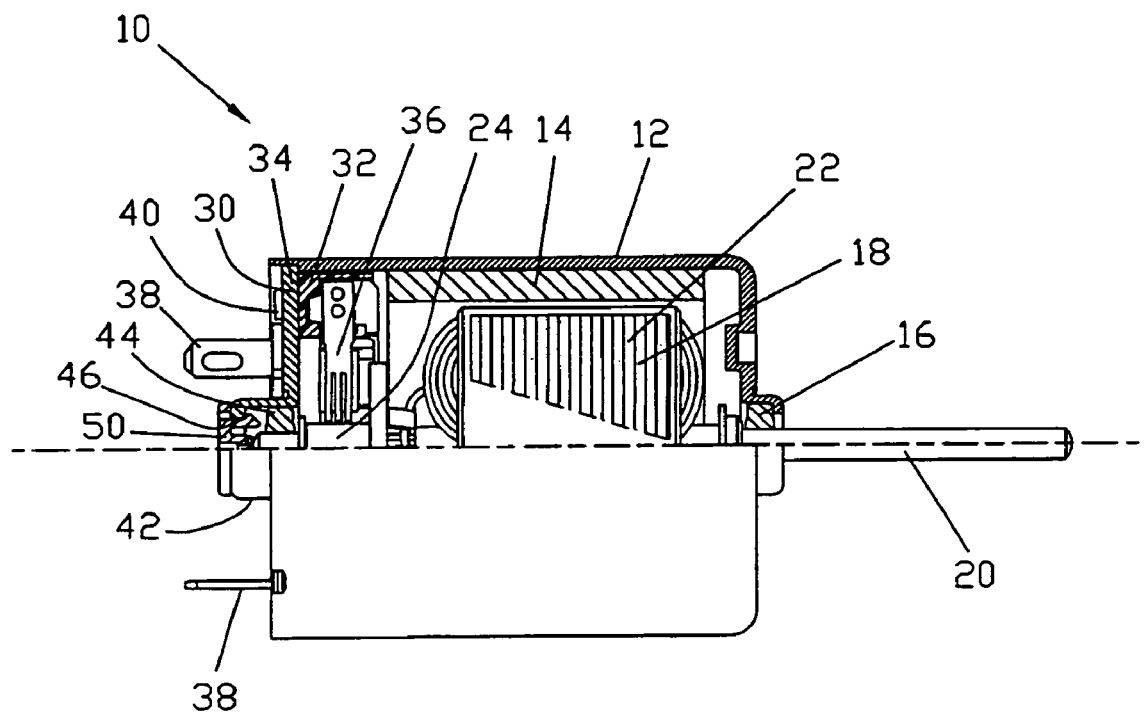
FIG. 1 is a part sectional view of an electric motor incorporating a thrust cap according to a first embodiment.

A miniature PMDC motor 10 is shown in FIG. 1. The motor has a housing, a permanent magnet stator 14 and a rotor 18. The housing has a rear housing 12 and an end cap 30. The rear housing 12 is a deep drawn can-like metal part having an open end and a closed end. The rear housing 12 supports the magnets of the stator 14. The closed end of the rear housing supports a sintered bronze bushing 16. The rotor 18 has a shaft 20 journalled in the bushing 16, an armature 22 and a commutator 24.

The open end of the rear housing is closed by the end cap 30. The end cap has two parts, a plastics material part 32 and a metal part 34. The plastics part 32 supports and insulates the brush gear, of which only a single fingerleaf brush 36 is shown, and motor terminals 38, from the metal part 34. Posts 40 on the plastics part 32 are used to connect the two parts of the end cap together by being plastically deformed after being passed through corresponding holes in the metal part 34. The metal part 34 has a bearing retainer 42 accommodating a second sintered bronze bushing 44 which supports one end of the shaft 20. The bearing retainer has a central opening 46 through which access to the end of the shaft can be made. A thrust cap 50 closes this opening.

Figure 2:
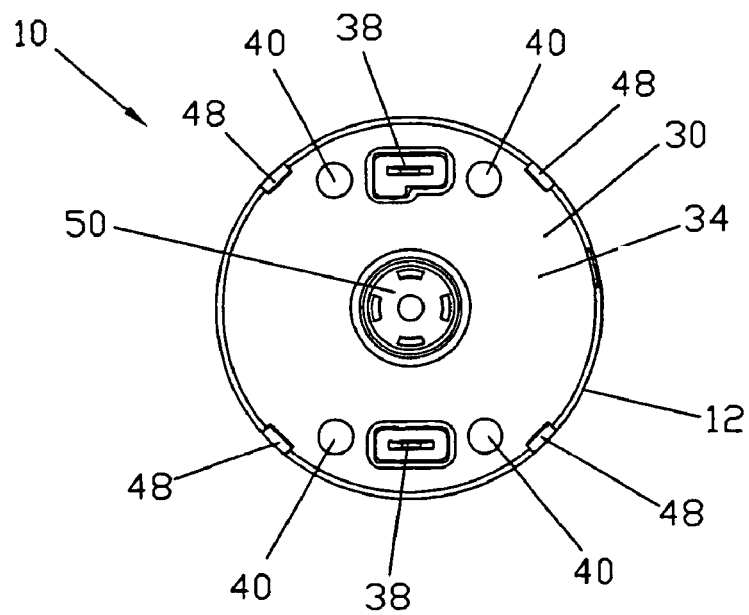
FIG. 2 is an end view of the motor of FIG. 1.

FIG. 2 is an end view of the motor of FIG. 1 showing the thrust cap 50 fitted to the end cap 30. Also visible are the four posts 40 and two motor terminals 38. The connection between the end cap 30 and the rear housing 12 is by way of crimps at the four locations labeled 48.

Figure 3:
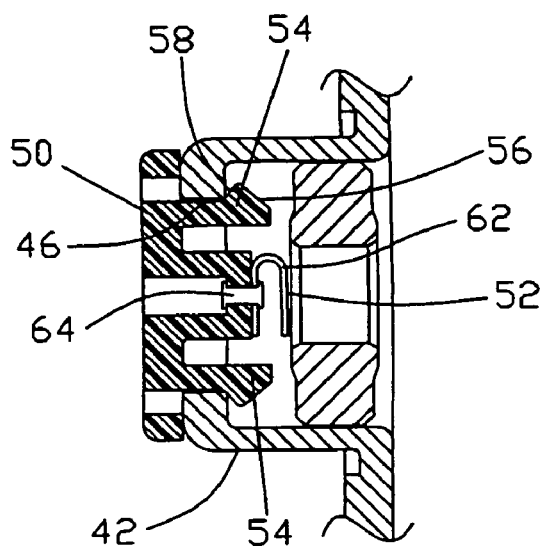
FIG. 3 is an enlarged sectional view of a part of the motor of FIG. 1 showing the thrust cap.

The thrust cap 50 and the connection between the thrust cap and the bearing retainer 42 is more clearly shown in FIG. 3. The thrust cap has a body supporting a bearing surface 52 which is arranged to be born against by the end of the shaft which is rounded to reduce friction. The body of the thrust cap has four fingers 54 which have tapered heads 56 with shoulders 58 forming an abutment surface. The fingers are resiliently deformable to allow the heads to pass through the opening 46 and spring back to engage the shoulders with the inner surface of the bearing retainer 42, thus forming a snap fit connection with the bearing retainer. The shoulders are sized and shaped to retain the thrust cap in position against the maximum or greatest expected axial thrust developed by the shaft in normal use.

The bearing surface 52 is provided by a U-shaped spring 62 fastened by rivet 64 to the body of the thrust cap. As the body of the thrust cap is not in direct contact with the shaft 20, it is not necessary for it to be made of low friction material, with the spring 62 being of suitable low friction spring material such as beryllium copper or stainless steel strips. The U-shaped spring 62 is shown in FIG. 3 in an unassembled rest condition in which the bearing surface 52 extends substantially perpendicularly to an intended shaft axis. Once assembled, the spring would be stressed by the shaft continuously such that the spring is resiliently deformed to move the bearing surface away from the perpendicular position.

The thrust cap of the invention as illustrated by the embodiments allows a pinion or cog to be fitted to the shaft of the motor without damaging the motor's thrust bearing by providing a thrust bearing which can be fitted to the motor after the pinion or cog has been fitted. Before the thrust cap is fitted, access to the end of the shaft can be gained through the opening 46 in the bearing retainer to support the shaft during fitting of the pinion or cog. After the pinion or cog has been fitted, the thrust cap is snapped into place to provide the thrust bearing to limit end play (axial movement of the shaft)

during use. The thrust cap provides a further feature of spring loading the thrust bearing surface. This avoids the knocking noise which is generated as the motor shaft strikes a hard thrust surface. The end cap also provides a transverse loading onto the end of the shaft to reduce bearing rattle.

Figure 4:
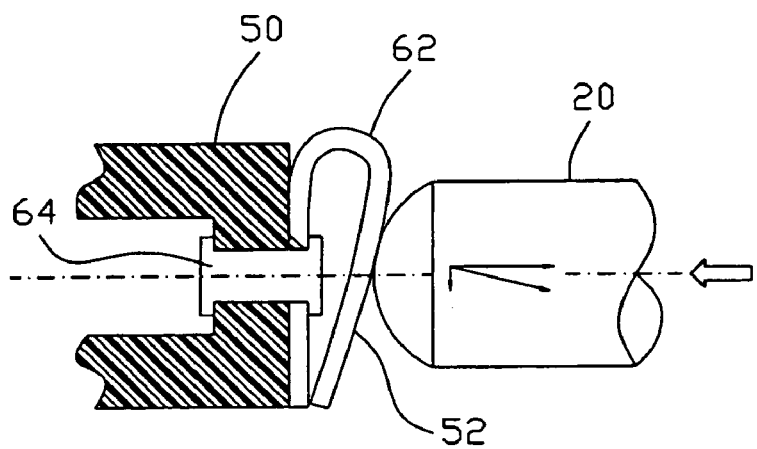
FIGS. 4 and 5 are schematic diagrams used to explain the function of the thrust cap.
Figure 5:
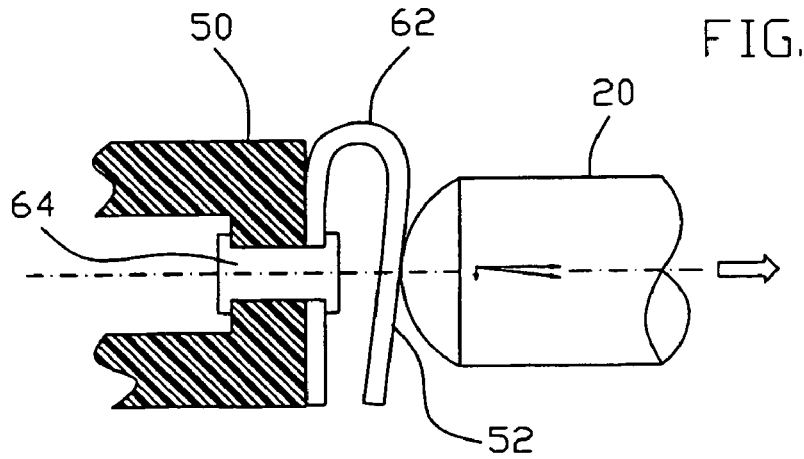

FIGS. 4 and 5 are schematics showing the effect of the offset spring force and illustrate a further advantage of providing a sprung thrust face in which the point of contact is offset from the axial centre of the shaft. As the shaft end is rounded, an axial force offset from the axis will have a radial component as well as an axial component. The axial component limits the end play while the radial component will be arranged to assist gravity and/or other radial force to urge the shaft to contact the bushing's bearing surface at a predetermined location. This helps to reduce bearing rattle which occurs when the shaft, as it rotates, tries to crawl around the bearing surface and then falls. FIG. 4 illustrates the shaft at its maximum travel position towards the thrust cap which FIG. 5 illustrates the shaft at its maximum travel position away from the thrust cap. It will be noted that the shaft is always in contact with the thrust cap and is always resiliently deforming the spring from its rest or undeformed position shown in FIG. 3. As such, the spring always imparts radial force to the end of the shaft. Indeed, in this arrangement, where the spring at rest extends perpendicularly to the shaft axis, the greater the shaft presses and thus deforms the spring, the greater the radial loading.

The spring could be formed to have a rest position which is not perpendicular to the shaft with the shaft pressing the spring towards the perpendicular position in which case as the spring is pressed by the shaft, it is resiliently deformed towards the perpendicular position in which case, the greater the shaft movement, the lesser the radial component.

Variations and modifications will be evident to the skilled addressee without departing from the spirit of the invention described and it is intended that all such variations and modifications are covered by this application.

The invention claimed is:

1. A thrust cap for an electric motor comprising:
   a thrust cap body;
   a thrust bearing surface supported by the body; and
   securing means for securing the thrust cap body to the electric motor, said securing means including a plurality of snap fit fingers having tapered heads with shoulders for engaging an inner surface of a housing part of said motor;
   wherein the thrust bearing surface is sprung and arranged to be in continuous contact with a rounded end of a shaft of the motor spaced from the axial center so as to provide radial and axial force components and to urge the shaft axially away from the thrust bearing cape and
   wherein the thrust bearing surface is provided by a U-shaped spring fixed to the thrust cap body.

2. The thrust cap of claim 1, wherein, the thrust bearing surface is metallic.

3. The thrust cap of claim 1, wherein, the thrust bearing surface is a part of the thrust cap body and the snap fit fingers are made from a single piece of resin material.

4. The thrust cap of claim 1, wherein, the thrust bearing surface is formed by an arm extending from a spring member fixed to the thrust cap body and able to be resiliently deformed within a predetermined range by the shaft.

5. A miniature electric motor incorporating the thrust cap of claim 1.

6. A miniature electric motor comprising:
   a housing having a stator and supporting two bearings in respective bearing retainers, each bearing retainer having an axial opening aligned with the bearings,
   a shaft supporting a rotor, having a first end and a second end, the first end being rounded, the shaft being journalled in the bearings and with the first end located within the first bearing retainer of the housing adjacent the axial opening and the second end located outside of the housing with the shaft passing through the axial opening of the second bearing retainer, and
   a thrust cap fitted externally to the housing,
   wherein the thrust cap has a thrust cap body which closes the axial opening of the first bearing retainer; a plurality of resiliently deformable fingers, each having a tapered head with a shoulder which engages an inner surface of the housing to form a snap fit securing means holding the thrust cap body to the housing; and a thrust bearing surface which is supported by and sprung with respect to the thrust cap body so as to make continuous contact with the rounded first end of the shaft at a location spaced from the axial center so as to urge the shaft radially and axially away from the thrust cap; and
   wherein the thrust bearing surface of the thrust cap is formed by an arm integral with a U-shaped spring attached to the thrust cap body and resiliently deformable within a predetermined range.

7. The motor of claim 6, wherein the thrust bearing surface is metallic.

8. The motor of claim 6, wherein the thrust cap body and the fingers are made from a single piece of resin material.

* * * * *